United States Patent [19]

Dugua

[11] Patent Number: 4,925,454
[45] Date of Patent: May 15, 1990

[54] ALUMINUM CHLORIDE GRANULES AND PROCESS TO OBTAIN THEM

[75] Inventor: Jacques Dugua, Charly Par Vernaison, France

[73] Assignee: Atochem, Paris, France

[21] Appl. No.: 317,143

[22] Filed: Mar. 2, 1989

Related U.S. Application Data

[63] Continuation of Ser. No. 110,944, Oct. 20, 1987, abandoned.

[30] Foreign Application Priority Data

Oct. 31, 1986 [FR] France ................... 86 15171

[51] Int. Cl.$^5$ ........................ B01D 7/00; C01F 3/00; C01F 7/48; C22B 13/00
[52] U.S. Cl. ........................ 23/305 A; 23/294 R; 423/495; 423/135
[58] Field of Search ................ 423/495, 135, 136; 23/294 R, 305 A; 55/88, 68, 82

[56] References Cited

U.S. PATENT DOCUMENTS

| | | | |
|---|---|---|---|
| 3,694,170 | 9/1972 | Fujii et al. | 23/305 A |
| 4,029,750 | 6/1977 | Schoener et al. | 423/495 |
| 4,070,448 | 1/1978 | Jacobs et al. | 55/82 |
| 4,334,898 | 6/1982 | Zhuber-Okrog et al. | 55/82 |
| 4,478,600 | 10/1984 | Schoener et al. | 55/82 |
| 4,479,927 | 10/1984 | Gelernt | 423/495 |
| 4,514,373 | 4/1985 | Wyndham | 423/495 |
| 4,650,778 | 3/1987 | Klabunde et al. | 423/495 |

*Primary Examiner*—Gary P. Straub
*Attorney, Agent, or Firm*—Sigalos, Levine & Montgomery

[57] ABSTRACT

A process for obtaining essentially cone-shaped aluminum chloride granules free of fines from a gas current containing aluminum chloride, comprising contacting said gas current with a surface whose temperature is below about 70° C. to deposit the aluminum chloride thereon in the form of cone-shaped granules and then heating said surface for a time and at a temperature sufficient to detach said granules from said surface; and the essentially cone-shaped product of such process.

6 Claims, No Drawings

ALUMINUM CHLORIDE GRANULES AND PROCESS TO OBTAIN THEM

This application is a continuation of application Ser. No. 110,944, filed Oct. 20, 1987, now abandoned.

BACKGROUND OF THE INVENTION

The present invention concerns new granules of anhydrous aluminum chloride and a procedure to produce these granules.

Aluminum chloride is often used as a catalyst in organic chemistry and also in the cosmetics industry. In the course of its manufacture, the aluminum chloride is obtained in the gaseous phase, possibly mixed with other products, and it is isolated by condensing it on a cold surface at ambient temperature. One thus obtains a crust of aluminum chloride which is detached from the surface by mechanical means such as vibrations or impact. The cold surface is simply the internal wall of a steel container exposed to the ambient air.

The crusts of aluminum chloride are crushed in order to obtain a product whose pieces of various shapes are smaller than 5 cm in their largest dimension. The crushing also produces dust and it is necessary to screen the aluminum chloride and recycle the fines. Japanese patent applications No. 34988/70 and 34989/70 of May 18, 1970, describe a procedure for isolating aluminum chloride in the gaseous phase consisting of causing the gas to pass over a surface kept at 80° or 85° C., then when the aluminum chloride has formed crystals, this surface is heated to 220° C. in order to detach the aluminum chloride which is recovered. Often these crystals, at the time of their formation and growth, have a tendency to stick to each other and to form a crust which it is necessary to crush and screen.

New granules of aluminum chloride have now been found which are characterized by the fact that they have essentially the shape of a cone.

SUMMARY OF THE INVENTION

The present invention substantially eliminates fines and eliminates the need for crushing and screening to obtain essentially cone-shaped granules of aluminum chloride.

Briefly, the present invention comprises a process for obtaining essentially cone-shaped aluminum chloride granules free of fines from a gas current containing aluminum chloride, comprising contacting said current with a surface whose temperature is below about 70° C. to deposit the aluminum chloride thereon in the form of cone-shaped granules and then heating said surface for a time and at a temperature sufficient to detach said granules from said surface; and the products of such process.

DETAILED DESCRIPTION

The process is characterized by the fact that a gas current comprising aluminum chloride is placed in contact with a surface whose temperature is below 70° C., said surface being subsequently heated in order that the granules detach themselves therefrom.

This process applies to all aluminum chloride-containing gases, and more particularly to those obtained during the course of its manufacture.

During the course of manufacture of aluminum chloride, in one of the stages of processes used, the aluminum chloride is obtained in the form of a gas mixed with other gases which can be inert gases such as nitrogen or air or reaction residues such as carbon dioxide, carbon monoxide, chlorine, chlorinated products, and the like. It can be a stage of a manufacture procedure of aluminum chloride as such, or a stage of a procedure during the course of which aluminum chloride is prepared for the purpose of making aluminum.

This aluminum chloride-containing gas is placed in contact with a cold surface whose temperature is below 70° C.

The aluminum chloride deposits on the cold surface in the form of granules having the shape of a cone, then, on heating the surface, the granules detach themselves and can be collected by gravity.

As a suitable cold surface, the external surface of any shape can be used, but preferably a parallelepiped one of whose dimensions is small with respect to the two others; that is to say, which has the shape of a more-or-less thick plate. The disposition of the cold surface can be any whatever, in fact only the temperature is essential in order to obtain these cones of aluminum chloride, but in order to facilitate the detachment and recovery of the cones it is preferred for the surface to be close to the vertical; the cones are thus easily collected by gravity as soon as they have been detached.

If one uses a vertical plate, the largest part of the surface is thus vertical, there remains a small surface at the bottom and another small surface at the top of the plate. The cones of aluminum chloride which are on the small surface at the bottom can drop without any problem, while on the contrary those on the surface at the top cannot drop easily.

If one wants to avoid a manual intervention or a mechanical device, one eliminates this horizontal surface and replaces it by a dihedron whose edge is in the upper part of the plate. In place of plates, one can use any shape (1) having the largest part of its external surface essentially vertical; (2) whose upper parts are sharp or rounded edges, that is to say not having a horizontal surface where the aluminum chloride could deposit itself on the upper part; and (3) whose only possible horizontal surfaces are essentially at the bottom of the shape, where the aluminum chloride deposits itself below the surface.

This cold surface can be arranged at the inside of a container which is supplied with gas containing the aluminum chloride.

It is convenient to use as the cold surface the internal wall of a container having a double jacket.

Since the gas containing the aluminum chloride is introduced into this container, the aluminum chloride deposits itself in conical granules on the cold wall and the uncondensable substances are degasified preferentially through an orifice different from the inlet of the gases containing the aluminum chloride. The wall can be of any material whatever, provided that it is resistant to aluminum chloride; one preferably uses ordinary steel, stainless steel or an alloy based on nickel. It is also preferred for the wall to be smooth.

The temperature of the wall is kept below 70° C. by means of a heat-exchanging fluid; i.e., a coolant. If one uses as the wall the external surface of a container, a coolant is advantageously placed into the container. If one uses the internal wall of a container having a double jacket, a heat-exchanging fluid is advantageously placed in that double jacket. One can use any conventional heat-exchanging fluid whatever, such as a gas, an organic product, water, low-pressure vapor, and the like.

When a metallic wall is used, the temperature of the fluid is very close to the temperature of the wall. It then suffices in order to adjust the temperature of the wall to adjust the temperature of the coolant. The temperature of the wall is advantageously kept between 10° and 70° C. and preferably between 40° and 60° C. It is also preferred for the temperature of the wall to be kept constant during the condensation of the aluminum chloride.

The pressure of the gas containing aluminum chloride is without importance, as well as the pressure in the container. Almost always this gas is at atmospheric pressure or very close thereto, and the condensation of the aluminum chloride is carried out at this pressure. As soon as the aluminum chloride is in contact with the cold wall, it condenses in the form of conical granules, the tip of the cone being against the cold wall. The crystals essentially touch one another by their base, but in general are neither stuck nor adhere or agglomerate to one another. The aluminum chloride thus obtained does not form a continuous crust and one can see the wall between the cones, across the empty spaces between the bases of the cones. As soon as this arrangement of cones of aluminum chloride has been obtained, the temperature of the previously cold wall is raised so that the tip of the aluminum chloride cone liquefies or sublimates, thus causing the detachment of the cone by gravity. A liquefaction or a sublimation is obtained, depending on whether the pressure is above or below that of the triple point (2.3 atm abs). It is preferred for the cone to detach itself under the effect of sublimation. It suffices to heat the wall for only a short instant in order to cause the detachment of the granulated material. Most often heating takes place to between 220° and 250° C.

In order to heat the wall, a heat-exchanging fluid can be used which is heated to a sufficient temperature so that the wall is hot enough to liquefy or sublimate the aluminum chloride. One can use the same heat-exchanging fluid as the one which brings the wall below 70° C., but whose temperature is changed by any known means; one can also have a reservoir of hot fluid and a reservoir of cold fluid, these two fluids can be identical or different, and are made to circulate alternately against the wall.

While the wall is being heated to detach the aluminum chloride, one can stop the introduction of the gas containing aluminum chloride into the container in order to avoid losing product. One collects aluminum chloride in the form of cones, without dust; these cones are at a temperature very close to that of the cold wall during their deposition. One can thus store them and, in particular, place them in barrels or other containers without having to cool them. It is preferable to heat the wall rapidly in order not to heat all of the granulated material. It is not necessary to sift the granules, there thus are no fines to be recycled. During the heating which causes the detachment of the aluminum chloride cones from the wall, a slight amount of aluminum chloride can sublimate; it is thus advantageous for this aluminum chloride to be able to deposit on a cold wall, for instance in another container linked to the preceding one. If one must treat a continuous gas current containing aluminum chloride, it is convenient to provide at least two containers, one having a cold wall, the other one being heated to detach the aluminum chloride; and one subsequently alternates the functions of the containers. One could also have any number whatever of containers. In the place of a container whose internal cold wall is used to collect the aluminum chloride, one can have cold surfaces arranged in any fashion whatever in the containers or other shapes or arrangements in the path of the gases containing the aluminum chloride. In the same container, one can also have cold walls on which the aluminum chloride crystallizes and hot walls with aluminum chloride which detaches itself. These granules can contain impurities which were present besides the $AlCl_3$ in the gaseous phase.

The advantage of the granules in conformity with the invention is that they can be collected by gravity without manual intervention or use of any mechanical device.

The invention will be further described in connection with the following examples which are set forth for purposes of illustration only.

EXAMPLE 1

A container consisting of a vertical pyrex tube of an internal diameter of 150 mm and a height of 500 mm, which is closed at the top and at the bottom by flanges of stainless steel is kept hot by means of an electric heating cord wound up inside of the tube and the blank flanges.

Inside of the tube, one arranges a hollow vertical plate of stainless steel of dimensions 300 mm×75 mm×10 mm. This plate is supplied with heat-exchanging fluid by a pipe of stainless steel, of an internal diameter of 6 mm, affixed to the upper part of the plate and which is prolonged inside of the plate by a dip tube descending down to the lower part. The exit of the heat-exchanging fluid takes place by a tap at the upper part of the plate and a pipe of stainless steel having an internal diameter of 6 mm. The plate is kept suspended in the midst of the tube by its supply pipes of heat-exchanging fluid which traverse the cover of the container (the blank flange in the upper part). On the upper horizontal part of the plate, a coil is added in which a heat-exchanging fluid circulates which is kept about 190° C. in order to prevent having granules on this upper horizontal surface. This coil is supplied by 2 pipes of stainless steel having an internal diameter of 6 mm which pass across the cover of the container. In addition to the inlet and outlet of the heat-exchanging fluid for the plate and the inlet and outlet for the coil, the cover includes the following: (1) a tap with a thermocouple dipping down to the interior of the container in order to measure the temperature in the container, (2) an inlet having a diameter of 12 mm for the gaseous aluminum chloride, and (3) a vent hole.

With the thermocouple one measures the temperature of the heat-exchanging fluid on exiting from the plate and one compares this temperature to the temperature of the plate which is the wall on which the granules of aluminum chloride form.

One regulates the temperature of the wall to 50° C. (by regulating the temperature of the heat-exchanging fluid) and then 312 g/h of gaseous aluminum chloride under atmospheric pressure are introduced into the container for 4 hours. The temperature in the container is 165° C. Then one rapidly heats the heat-exchanging fluid in order to obtain a wall temperature of 220° C. and after about 3 minutes all of the granules have become detached from the wall and have dropped to the bottom of the cylinder. One dismantles the bottom flange of the container in order to collect them.

EXAMPLE 2

Operation takes place as in Example 1, but with a wall temperature of 34° C.

EXAMPLE 3

Operation takes place as in Example 1, but with a wall temperature of 46° C.

The granules obtained in Examples 1 to 3 are cones of a height between 10 and 20 mm and whose diameter at the base is 8 mm on the average. They are perfectly detached from each other when they are detached from the wall. In Example 1, one obtains 72% (by weight) of screenings with a 4 mm sieve; 94.5% with a sieve of 2 mm and 97.7% with a sieve of 1.2 mm.

EXAMPLE 4
(COMPARATIVE)

Operation takes place as in Example 1, but with a wall temperature which is not in conformity with the invention; i.e., 81° C.

EXAMPLE 5

Operator takes place as in Example 1, but with a wall temperature which is not in conformity with the invention; i.e., 120 ° C.

In Examples 4 and 5, the aluminum chloride condenses in rods and granules of any shape whatever which adhere to one another to the point of forming compact crusts or plates which must be crushed.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for obtaining essentially cone-shaped aluminum chloride granules free of fines from a gas current containing aluminum chloride, comprising contacting said gas current with a shape having vertical or substantially vertical surfaces and free of any horizontal surface at the top or sides of the shape, the temperature of said surfaces being below about 70° C., to deposit the aluminum chloride thereon in the form of cone-shaped granules having a height of about 0.5 to 5 cm and a ratio of height to diameter at the base of the cones being between 1 and 10 with the tips of the granules attached to said surfaces and the bases thereof extending therefrom, ceasing the flow of said gas current when the bases of the cones contact each other, then heating said surfaces for a time and at a temperature sufficient to detach said granules from said surfaces by sublimation of the cone tips attached to said surfaces, and recovering said cone-shaped granules.

2. The process of claim 1, wherein the temperature of the surface is between about $10°\pi$C. and 70° C. and kept constant while the granules are being formed.

3. The process of claim 1 or 2, wherein the temperature of the surface is between 40° C. and 60° C., and kept constant while the granules are being formed.

4. The process of claim 1 or 2, wherein the surface is heated above the sublimation temperature of the aluminum chloride to detach the particles from said surface.

5. The process of claim 1 or 2, wherein the surface is heated to a temperature between the sublimation temperature of the aluminum chloride and 250° C.

6. Essentially cone-shaped aluminum-chloride granules that are the product of the process of any one of claims 1 or 2.

* * * * *

UNITED STATES PATENT AND TRADEMARK OFFICE
CERTIFICATE OF CORRECTION

PATENT NO. : 4,925,454

DATED : May 15, 1990

INVENTOR(S) : DUGUA, Jacques

It is certified that error appears in the above-identified patent and that said Letters Patent is hereby corrected as shown below:

Column 6, line 23, cancel " $\pi$ C." and substitute therefor -- C. --.

Signed and Sealed this

Nineteenth Day of November, 1991

Attest:

HARRY F. MANBECK, JR.

Attesting Officer    Commissioner of Patents and Trademarks